US010412228B1

(12) United States Patent
Haus et al.

(10) Patent No.: US 10,412,228 B1
(45) Date of Patent: *Sep. 10, 2019

(54) CONFERENCE CALL MUTE MANAGEMENT

(71) Applicant: Capital One Services, LLC, McLean, VA (US)

(72) Inventors: Oron Haus, Fairfax, VA (US); Rudolph Wolfs, Naples, FL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,034

(22) Filed: Nov. 8, 2018

Related U.S. Application Data

(63) Continuation of application No. 16/040,162, filed on Jul. 19, 2018, now Pat. No. 10,142,485.

(51) Int. Cl.
*H04M 3/56* (2006.01)
*H04L 29/06* (2006.01)

(52) U.S. Cl.
CPC ........ *H04M 3/568* (2013.01); *H04L 65/4038* (2013.01); *H04M 2250/62* (2013.01)

(58) Field of Classification Search
CPC ... H04L 29/06027; H04M 3/56; H04M 3/567; H04M 3/568; H04M 2203/5018; H04M 2203/5063; H04M 2201/40
USPC ............ 379/202.01, 203.01, 204.01, 205.01, 379/207.02, 201.01, 88.01, 88.02
See application file for complete search history.

(56) References Cited

U.S. PATENT DOCUMENTS

| 6,212,275 | B1 | 4/2001 | Akhteruzzaman |
| 7,099,825 | B1 | 8/2006 | Cook |
| 8,060,366 | B1 | 11/2011 | Maganti et al. |
| 9,247,204 | B1 | 7/2016 | Yin et al. |
| 9,640,194 | B1 | 5/2017 | Nemala et al. |
| 9,756,187 | B2 | 9/2017 | Chintala |
| 10,142,485 | B1 | 11/2018 | Haus et al. |
| 2003/0125954 | A1 | 7/2003 | Bradley et al. |
| 2008/0037751 | A1 | 2/2008 | Aldrey |
| 2010/0061538 | A1 | 3/2010 | Coleman |
| 2010/0067680 | A1 | 3/2010 | Hanson et al. |
| 2011/0075829 | A1* | 3/2011 | Goldman .......... H04M 3/42365 379/202.01 |
| 2013/0051543 | A1 | 2/2013 | McDysan et al. |

(Continued)

OTHER PUBLICATIONS

Jens Meggers, "Rid Your Meetings of Dogs and Doorbells", https://blogs.cisco.com/collaboration/cut-background-noise-out-of-meetings, Aug. 10, 2017, 17 pages.

*Primary Examiner* — Thjuan K Addy
(74) *Attorney, Agent, or Firm* — Harrity & Harrity, LLP

(57) ABSTRACT

A device receives call data associated with a conference call between a plurality of users. The call data includes at least two of: data identifying each of the plurality of users, data identifying user activity associated with at least one user in the plurality of users, and conference call metadata associated with the conference call. The call muting platform receives voice data associated with the conference call. The voice data is associated with at least one vocal utterance associated with the plurality of users. The call muting platform provides the call data and the voice data to a second device, and receives mute data from the second device. The mute data indicates whether to mute or un-mute a particular user of the plurality of users.

20 Claims, 7 Drawing Sheets

(56) References Cited

U.S. PATENT DOCUMENTS

2014/0105407 A1 4/2014 Herger et al.
2015/0195411 A1 7/2015 Krack et al.

* cited by examiner

CONFERENCE CALL MUTE MANAGEMENT

RELATED APPLICATION

This application is a continuation of U.S. patent application Ser. No. 16/040,162, filed Jul. 19, 2018 (now U.S. Pat. No. 10,142,485), which is incorporated herein by reference.

BACKGROUND

Conference calls include voice and/or video calls that take place between user devices (e.g., telephones, personal computers, tablet computers, and/or the like). When participating in a conference call, each user is generally responsible for controlling whether a microphone of the user device is active.

SUMMARY

According to some implementations, a method may include receiving, by a first device, call data associated with a conference call between a plurality of users. The call data may include at least one of: data identifying the plurality of users, data identifying user activity associated with at least one user included in the plurality of users, or conference call metadata associated with the conference call. The method may include obtaining, by the first device, a mute model based on the call data. The mute model may be trained to receive voice data as input, and the mute model may be trained to produce mute data as output. The mute data may indicate whether a user should be muted or un-muted. The method may include receiving, by the first device, voice data associated with the conference call. The voice data may be associated with a vocal utterance associated with a particular user included in the plurality of users. The method may include determining, by the first device, whether to mute or un-mute the particular user based on the call data, the voice data, and the mute model. The method may include providing, to a second device, mute data. The mute data may indicate whether the particular user should be muted or un-muted.

According to some implementations, a device may include one or more memories, and one or more processors, communicatively coupled to the one or more memories, to receive call data associated with a conference call between a plurality of users. The call data may include at least one of: data identifying each of the plurality of users, data identifying user activity associated with at least one user in the plurality of users, or conference call metadata associated with the conference call. The one or more processors may receive voice data associated with the conference call. The voice data may be associated with a vocal utterance associated with a first user included in the plurality of users. The one or more processors may determine whether to mute or un-mute a second user of the plurality of users based on the call data and the voice data. The one or more processors may provide, to a second device, mute data. The mute data may indicate whether the second user should be muted or un-muted.

According to some implementations, a non-transitory computer-readable medium may store instructions that include one or more instructions that, when executed by one or more processors of a device, cause the one or more processors to receive call data associated with a conference call between a plurality of users. The call data may include at least two of: data identifying each of the plurality of users, data identifying user activity associated with at least one user in the plurality of users, and conference call metadata associated with the conference call. The one or more instructions may cause the one or more processors to receive voice data associated with the conference call. The voice data may be associated with at least one vocal utterance associated with the plurality of users. The one or more instructions may cause the one or more processors to provide the call data and the voice data to a second device. The one or more instructions may cause the one or more processors to receive mute data from the second device. The mute data may indicate whether to mute or un-mute a particular user of the plurality of users.

DETAILED DESCRIPTION

Figure 1A:
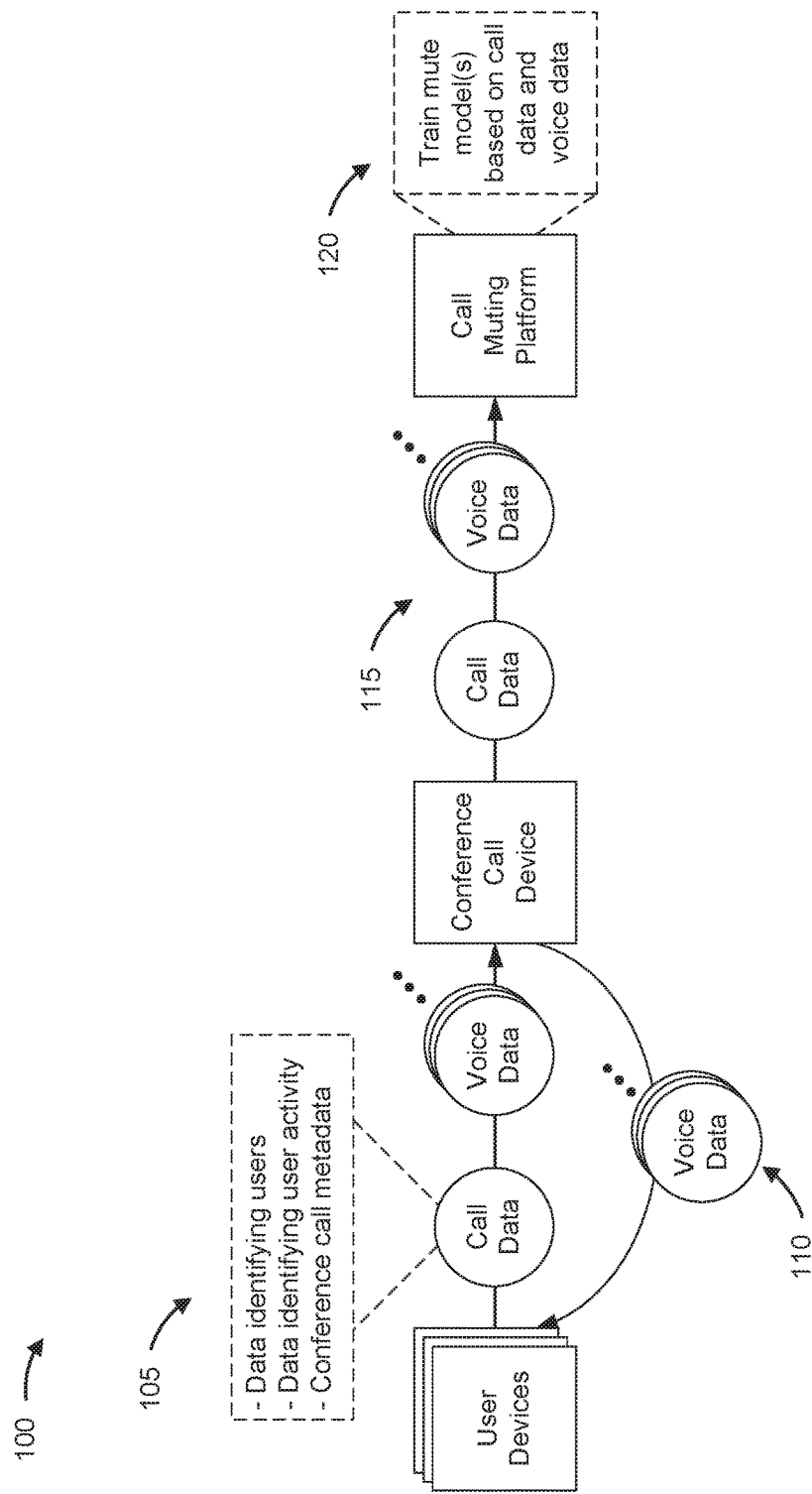
FIGS. 1A-1B are diagrams of an overview of an example implementation described herein.

The following detailed description of example implementations refers to the accompanying drawings. The same reference numbers in different drawings may identify the same or similar elements.

Conference calls between individuals (e.g., users) may take place using a variety of user devices and software, including land-line based telephones, smart phones, laptop computers, desktop computers, wearable devices, and/or the like. Often, during a conference call, each user is responsible for muting and/or un-muting the user device that the user is using (e.g., via hardware and/or software associated with the user device) when the user wishes to mute or un-mute the microphone of the user device. Some conference call software enables one or more users on the conference call to mute and/or un-mute other users participating in the call. However, despite the methods of mute management available, users are often muted when they wish to be un-muted and/or un-muted when they wish to be muted, which results in a poor user experience for multiple users participating in the conference call.

Some implementations, described herein, provide a call muting platform designed to provide conference call mute management functionality in an automated or semi-automated manner, using information about a conference call and the participants to determine when users should be muted and/or un-muted during the conference call. For example, the call muting platform may obtain call data for a conference call (e.g., call data including data identifying the users participating in the conference call, previous user conference call activity, conference call metadata, and/or the like). Using the call data, the call muting platform may obtain a mute model, such as a mute model trained via machine learning to receive voice data (e.g., vocal utterances and/or noises) as input and produce mute data (e.g., an indication regarding whether a user should be muted or un-muted) as output. Using the mute model, the call data, and the voice data, the call muting platform may determine whether one or more users should be muted and/or un-muted. After making the determination, the call muting platform may send data indicating whether a user or users should be muted and/or un-muted to another device, such as a user device or a conference call device (e.g., a device associated with a conference call broker hosting the conference call), so that the identified user(s) may be muted or un-muted. In some implementations, the determinations regarding muting and un-muting may be made multiple times throughout a conference call and performed automatically, e.g., without the need for user input other than the vocal utterances.

In this way, a call muting platform may facilitate mute and un-mute operations automatically for a conference call, in a manner designed to ensure that users participating in the conference call are muted and/or un-muted as appropriate. Automatically managing the mute and/or un-mute operations may improve user experience for participants in a conference call. Automating one or more stages of the process for conference call mute management may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for conference call mute management conserves computing resources (e.g., processor resources, memory resources, and/or the like) and time that would otherwise be wasted by using manual investigative processes for attempting to determine when a conference call line should be muted or un-muted.

Figure 1B:
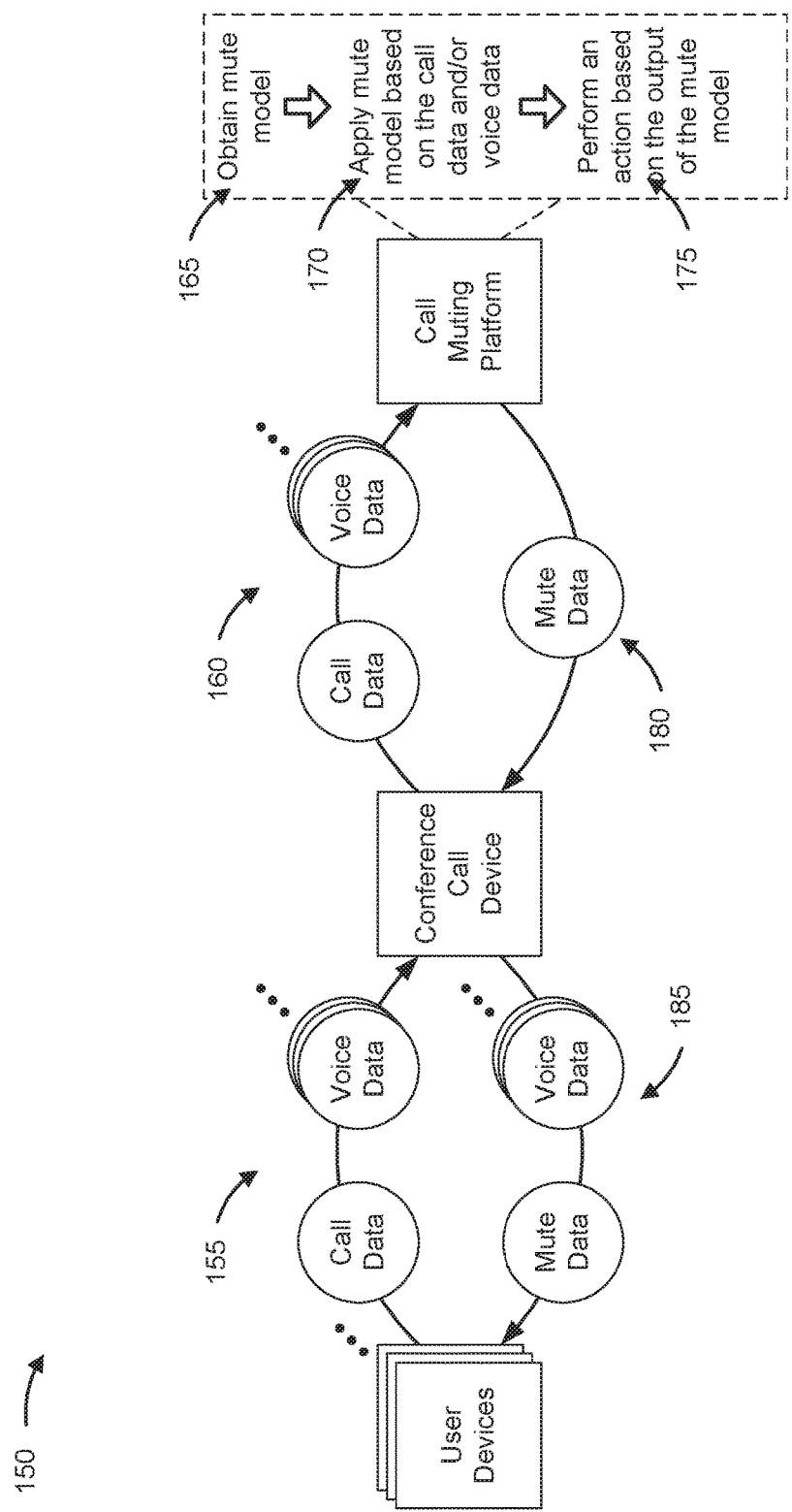

FIGS. 1A-1B are diagrams of example implementations described herein. As shown in FIG. 1A, example implementation 100 includes user devices (e.g., personal computers, mobile devices, wearable devices, and/or the like), a conference call device (e.g., a server computer, cloud computing platform, and/or the like), and a call muting platform (e.g., a server computer, a cloud computing platform, and/or the like). While the devices of implementation 100 are depicted separately, in some implementations, the functionality of one or more of the devices of implementation 100 may be included in another device, or may be included in multiple, distributed devices. Implementation 100 depicts data exchanged in an example conference call, from which the call muting platform may generate one or more mute models.

As shown by reference number 105, the conference call device receives call data and voice data from the user devices that are participating in a conference call. Call data may include a variety of information related to the conference call, such as data identifying the users participating in the conference call (e.g., user names, user phone numbers, user identifiers, user roles, and/or the like), data identifying user activity associated with the conference call (e.g., data indicating how often a user was muted and/or un-muted during the conference call, data indicating which users were speaking at which times during the conference call, and/or the like), conference call metadata (e.g., the creator of the conference call, the agenda for the conference call, conference call roles associated with the users participating in the conference call, a subject of the conference call, and/or the like), and/or the like. Voice data may include vocal utterances and/or noise that is received during the conference call, such as audio input received by microphones associated with the user devices (e.g., users speaking on the conference call, background noise, and/or the like). Voice data may include other information regarding the vocal utterances and/or noise, such as voice metadata indicating which user is associated with which vocal utterances and/or noise.

As shown by reference number 110, the conference call device provides voice data to the user devices. The voice data provided to the user devices may be the same as or different from the voice data received by the conference call device. For example, in some implementations, the conference call device (e.g., the device that hosts the conference call between the user devices) provides each of the user devices on the conference call with all the voice data it receives. In some implementations, the conference call device may perform one or more actions to determine whether received voice data should be provided to other user devices on the conference call. For example, the conference call device may perform a noise detection process designed to prevent noise (e.g., non-speech) received from one of the user devices from being provided to other user devices on the conference call. As another example, the conference call device may determine which users participating in the conference call are authorized to speak (e.g., based on pre-defined conference call settings, roles, and/or the like) and only provide voice data to user devices if the voice data was received from a user device authorized to speak on the conference call. Other actions, including the use of mute data to determine whether voice data should be provided to the user devices, may also be performed by the conference call device, as described in further detail, below.

As shown by reference number 115, the call muting platform receives call data and voice data from the conference call device. The call data and voice data received by the call muting platform may be the same as, or different from, the call data and voice data received by the conference call device. For example, in some implementations, the conference call device may forward all call data and voice data to the call muting platform. In some implementations, the voice data may be transcribed prior to the voice data being provided to the call muting platform. For example, the conference call device may include or otherwise be associated with an audio transcription device, application, and/or the like, designed to transcribe the voice data into text. In a situation where voice data is transcribed, the voice data received by the call muting platform may include text (e.g., a speech to text transcription). Voice data, whether transcribed into text or in audio format, may also include voice metadata, such as data identifying the source (e.g., the user) of particular vocal utterances and/or noise.

As shown by reference number 120, the call muting platform trains one or more mute models based on the call data and the voice data. A mute model is designed to receive at least a portion of the call data and/or voice data as input, and produce mute data as output. The mute data may indicate, for example, whether one or more users participating in the conference call should be muted or un-muted. In some implementations, a single mute model may be used to receive input (e.g., call data and/or voice data) and provide mute data as output. In some implementations, multiple mute models may be used, e.g., separately, sequentially, and/or the like. For example, in some implementations, one mute model may be trained to produce mute data based on receiving call data and voice metadata, but not voice data (e.g., no vocal utterances and/or transcriptions of vocal utterances). Another mute model may be trained to produce mute data based on receiving voice data only, but no call data or voice metadata (e.g., trained to use, as input, only vocal utterances and/or transcriptions of vocal utterances).

In some implementations, mute models may be trained for different types of conference calls, different users or types of users, and/or the like. For example, a general mute model may be trained to be used for all conference calls. Organization specific mute models may be trained for each organization for which the call muting platform manages muting. User roles, whether organization specific, conference call specific, or otherwise, may each be associated with a separately trained mute model (e.g., a mute model for the organizer of a conference call, a mute model for an organizer at a specific organization, a mute model for a participant, a mute model for a manager at a specific organization, and/or the like). As another example, individual users may each be associated with a mute model, enabling a mute model to be associated with a corresponding user. Mute models may be trained based on conference call topics, enabling the call muting platform to manage muting for conference calls differently based on different conference call topics. The call muting platform may train any combination of one or more of the foregoing mute models, in a manner designed to provide mute models at various degrees of granularity.

The call muting platform may use a variety of methods for training one or more mute models. Mute models may be trained using supervised (or unsupervised) machine learning methods, including techniques such as K-nearest neighbors, support vector machine (SVM), linear regression, non-linear regression (e.g., logistic regression), Naive Bayes modeling, hidden Markov modeling, and/or the like. One or more natural language processing techniques may also be included in one or more mute models, e.g., in a manner designed to perform entity recognition, relationship extraction, speech recognition, sentiment analysis, and/or the like.

In some implementations, a user recognition module (e.g., trained by the call muting platform or a separate device, platform, and/or the like) may be trained to determine which user is speaking the vocal utterance, which user(s) the vocal utterance is directed to, and/or which action is associated with the vocal utterance. The user recognition model may, in some implementations, be included in the mute model, or may be a separately trained model. To train a user recognition model to determine which user is speaking, the call muting platform may receive voice data metadata from the conference call device, which indicates which user is speaking (e.g., by user name, user identifier, user phone number, user role, and/or the like). In a situation where voice metadata is not available, or does not identify the user that is speaking, users may be identified using other techniques that may be enhanced via machine learning, including voice matching, speech pattern recognition, matching information regarding a user device to a database that maps user devices and users, and/or the like. By way of example, a user recognition model may be trained to determine that a person addressed in voice data is the person who will speak next after being addressed (e.g., the user that speaks following the utterance, "hey John, what do you think?" is likely to be John).

To train a user recognition model (or a mute model) to determine which user(s) the vocal utterance is directed to, a variety of recognition techniques may be used by the call muting platform. For example, users may be identified by their name, a user name, a phone number, a role, and/or the like. In some implementations, contextual information may be used to determine which user or users are identified by a vocal utterance. For example, the utterance, "hey John, what do you think?" may identify a user (John) by name; the utterance, "Is anyone from human resources on the call?" may identify a subset of the users that are participating on the call and also associated with a human resources department, role, or organization; the utterance, "someone has an open microphone with background noise" may identify any users with an open/active microphone; the phrase "what do you think?" may identify the user who was previously speaking; and the utterance, that's all I have," may identify the user who is currently speaking. The user recognition model may be trained, for example, using annotated voice data that includes vocal utterances similar to those above, as well as annotations identifying the user(s) identified by the vocal utterances. Other training techniques may also be used, including the use of additional training data and/or pre-built models, such as using annotated entity recognition data and/or an entity recognition model, which may be combined with the call data and voice data to train a user recognition model and/or mute model to determine which user(s) a vocal utterance is directed to.

To train a mute model to determine which action is associated with the vocal utterance, the call muting platform may also use a variety of techniques. The available actions are muting and/or un-muting and, in some implementations, multiple actions may be determined for multiple users (e.g., the users to which the vocal utterance is directed). The mute model may be trained by associating various phrases and/or types of vocal utterances with one or more actions. For example, vocal utterances, or phrases, that are determined to be a question may be associated with an un-mute action (e.g., often, on a conference call, a question may be likely to elicit an answer from a user who is not the user speaking the question). By way of example, the utterance, "hey John, what do you think?" may be followed by a user associated with the name "John" un-muting a microphone and speaking, while the user who asked the question remains silent. In this situation, the mute model may be trained to determine that utterances similar to "hey John, what do you think?" should be associated with two actions: a first action that includes un-muting the user to which the utterance is directed (e.g., John), and a second action that includes muting the user who spoke the utterance (e.g., the user that asked the question). As another example, the utterance, "Does anyone have any questions?" may be associated with an action that includes un-muting all users on the conference call.

In some implementations, the mute model may also be trained to produce, as output, a measure of confidence in the mute model's prediction. The measure of confidence may be affected by a variety of features (e.g., aspects of call data and/or voice data). Example features affecting a measure of confidence in determining whether a user should be muted or un-muted may include: how often a particular user speaks on a particular type of conference call (e.g., a recurring conference call), how often a particular user speaks on any conference call, how often a user associated with a particular role speaks on a particular type of conference call, how often a user associated with a particular role speaks on any conference call, and/or the like.

While the example implementation 100 depicts the call muting platform training a mute model using call data and voice data from a single conference call, the call muting platform may use call data and voice data for many conference calls in training a mute model. Some mute models may be specific to a subset of users (e.g., users with a particular role, users associated with a particular organization, and/or the like), while some mute models may be generated for application to all conference calls. In a situation where the call muting platform uses call data and voice data from multiple conference calls, patterns in conference calls may be identified and accounted for in the trained mute models. For example, and as discussed above, user specific, role specific, conference call specific (e.g., for repeating conference calls), and/or organization specific utterances and/or actions may be determined and accounted for in training one or more mute models that are specific to a user, role, conference call, organization, and/or the like.

As shown in FIG. 1B, example implementation 150 includes user devices (e.g., the same user devices or different user devices than the user devices depicted in implementation 100), the conference call device (e.g., the same conference call device or different conference call device than the conference call device depicted in implementation 100), and the call muting platform (e.g., the same call muting platform or different call muting platform than the call muting platform depicted in implementation 100). Implementation 150 depicts data exchanged in an example conference call, during which the call muting platform may apply a mute model and provide mute data to another device or devices (e.g., the conference call device and/or user devices).

As shown by reference number 155, the conference call device receives call data and voice data from one or more user devices participating in a conference call. The call data and voice data may be similar to the call data and voice data described above (e.g., with respect to implementation 100). For example, the call data may indicate various aspects of a conference call, such as the conference call title, a subject associated with the conference call, whether the conference call is a recurring conference call, users associated with the conference call, roles associated with the users participating in the conference call, and/or the like. The voice data may include audio provided from user devices used by users participating in the conference call. The voice data may also include metadata, such as information identifying which users are speaking, which users are muted and/or un-muted, and/or the like. In some implementations, the call muting platform may receive the call data prior to the commencement of the conference call (e.g., in a situation where the conference call was scheduled ahead of time, a user device, conference call device, or another device, may provide the call muting platform with at least a portion of the call data). In some implementations, the call data is received as a conference call is initiated (e.g., in a situation where the conference call was not previously scheduled or in a situation where the call muting platform was not previously provided with the call data).

As shown by reference number 160, the call muting platform receives the call data and the voice data from the conference call device. The call data may be provided at any time, including prior to the call (e.g., for a pre-scheduled conference call), and may be updated during the call in a situation where the conference call changes (e.g., roles change, users are added and/or removed from the conference call, and/or the like). In some implementations, the conference call device provides the voice data to the call muting platform as the voice data is received by the conference call device, e.g., in a manner designed to quickly provide the call muting platform with voice data, enabling the call muting platform to quickly provide mute data to the conference call device and/or user devices. In some implementations, the voice data received by the call muting platform includes transcribed voice data (e.g., text). The voice data may be transcribed, for example, by the conference call device, by the call muting platform, or by another device in communication with the conference call device and/or call muting platform.

As shown by reference number 165, the call muting platform obtains a mute model (or multiple mute models in a situation where multiple mute models are applicable to a conference call). The mute model (or models) may be obtained before the conference call or after the conference call has begun. The mute model obtained by the call muting platform may be based on the call data and/or the voice data. For example, in a situation where a conference call specific mute model has been trained (e.g., for a recurring conference call), the call muting platform may obtain the conference call specific mute model based on information included in the call data that identifies the corresponding recurring conference call (e.g., the conference call title, participants, schedule, and/or the like). As another example, in a situation where an organization specific mute model has been trained (e.g., for conference calls associated with a particular organization), the call muting platform may obtain the organization specific mute model based on information included in the call data that identifies the organization associated with the conference call (e.g., user names, user e-mail domains, source of the call data, and/or the like). As noted above, in some implementations, multiple mute models may be used, in which case, the call muting platform may obtain multiple mute models (e.g., for combined usage, sequential usage, and/or the like, such as using a natural language processing model before using a model designed to produce a mute/un-mute decision).

As shown by reference number 170, the call muting platform applies the mute model using the call data and/or voice data. Application of the mute model may include, for example, providing the mute model with input (e.g., call data and/or voice data) to obtain mute data as output. As shown by reference number 175, the call muting platform performs an action based on the output of the mute model. For example, using the mute data provided as output from the mute model, the call muting platform may determine that one or more users should be muted and/or un-muted; determine that one or more users should be provided with data indicating that they may want to mute or un-mute the user device that corresponds to the user, and/or the like.

For example, the call muting platform may receive, from the mute model, mute data that indicates a particular user should be un-muted. Using the example utterance, "hey John, what do you think?" the call muting platform may use the mute data provided by the mute model to determine that a user identified as "John" should be un-muted. In some implementations, one or more measures of confidence may be included in the mute data provided by the mute model. In the example above, the mute model may indicate 95% confidence that "John" is correctly identified as the user to which the utterance is directed, and a 90% confidence that the action to take is "un-mute." As another example, for the utterance, "does anyone have any questions?" the mute model may produce mute data indicating a different measure of confidence for each user on the conference call (e.g., each measure of confidence being based on information regarding the corresponding user, such as how often a user speaks, how often a user in that role speaks, and/or the like), and an 85% confidence in the "un-mute" action.

In some implementations, the call muting platform may use one or more thresholds to determine an action to take based on the mute data. For example, in a situation where a threshold of 85% confidence is used (on a scale of 0% to 100% confidence), mute data associated with a measure of confidence below the threshold may not be communicated to the conference call device and/or one of the user devices. As another example, thresholds may be used to change the action to be taken based on mute data. Using the example threshold of 85% above, mute data associated with confidence meeting the 85% threshold may cause the call muting platform to perform an action causing automatic muting and/or un-muting (e.g., providing mute data that causes a user to be muted and/or un-muted), while mute data associated with confidence that does not meet the 85% threshold may cause the call muting platform to provide no mute data, or to provide mute data that causes a notification to be displayed on a user device (e.g., a notification indicating that a user may wish to un-mute the user device). Other thresholds, such as separate thresholds for separate mute model results, and separate thresholds for additional and/or different actions, may also be used to determine which action(s) the call muting platform will perform.

In some implementations, mute models may be included in, combined with, or used in addition to other models designed to facilitate conference call communications. For example, a mute model may be combined with a model designed to detect whether a user is speaking while muted, to facilitate determining which action(s) to take based on received voice data. As another example, a mute model may be combined with a model designed to detect noise, including loud or otherwise disruptive background noise that may be capable of being eliminated by muting one or more users. Other models may be applied by the call muting platform, or may be applied by separate devices in communication with the conference call device and/or call muting platform.

As shown by reference number 180, the call muting platform provides mute data to the conference call device. In some implementations, the mute data includes the output of the mute model (e.g., as described above). In some implementations, the mute data may be modified by the call muting platform (e.g., to include additional and/or different data regarding whether a user should be muted or un-muted) prior to the call muting platform providing the mute data to the conference call device. While the example implementation 150 depicts the mute data being provided to the conference call device and, as shown by reference number 185, provided to user devices along with voice data, in some implementations, the mute data may be provided directly to one or more of the user devices.

The mute data may include a variety of information, including the output from the mute model(s) applied by the call muting platform. In some implementations, the mute data includes instructions that cause automatic muting and/or unmuting of one or more users participating in the conference call. The instructions may be directed to the conference call device (e.g., in a situation where the conference call device is capable of muting and/or un-muting users participating in the conference call) and/or a user device (e.g., in a situation where the user device includes software capable of muting and/or un-muting the user device). In some implementations, the mute data includes instructions that cause a notification to be provided for a user device. For example, the mute data may include instructions that cause a user device to play an audio tone and/or display a pop-up suggesting that the user associated with the user device may wish to mute or un-mute the user device.

To perform mute management using the example utterance, "hey John, what do you think?" a variety of different types of mute data may be provided by the call muting platform. For example, the mute data may include the results of the mute model (e.g., with or without confidence scores). In a situation where the conference call device performs muting and/or un-muting of user devices participating in the conference call, the conference call device may use the results of the mute model, including any applicable confidence scores, to determine which user device is associated with John and whether the user device associated with John should be un-muted. As another example, the mute data may include instructions to cause display of an indication on the user device associated with John. For example, the conference call device may identify the user device associated with John and provide mute data to the user device, e.g., causing a conference call application operating on the user device to display a visual indicator suggesting that the user (e.g., John) un-mute a microphone associated with the user device. As noted above, other information designed to cause other actions (e.g., muting and/or un-muting multiple users, using audio notifications, and/or the like) may be included in mute data.

In some implementations, the call muting platform may provide multiple types of mute data based on a single vocal utterance, or phrase. By way of example, the example utterance, "hey John, what do you think?" may result in the mute model producing, in addition to mute data that causes a user device associated with John to un-mute, mute data that may be provided to the user that spoke the example utterance (e.g., the user who asked the question may be automatically muted while John answers). In a situation where multiple users associated with the identifier, "John," are participating in the conference call, one user (e.g., a user who often speaks during conference calls when addressed with "John") may be automatically un-muted, while another user (e.g., a user named John who does not often speak during conference calls) may be provided with a notification suggesting that the other user un-mute the corresponding user device.

In this way, a call muting platform may facilitate mute and un-mute operations automatically for a conference call, in a manner designed to ensure that users participating in the conference call are muted and/or un-muted as appropriate. Automatically managing the mute and/or un-mute operations may improve user experience for participants in a conference call. Automating one or more stages of the process for conference call mute management may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for conference call mute management conserves computing resources (e.g., processor resources, memory resources, and/or the like) and time that would otherwise be wasted by using manual investigative processes for attempting to determine when a conference call line should be muted or un-muted.

As indicated above, FIGS. 1A-1B are provided merely as an example. Other examples are possible and may differ from what was described with regard to FIGS. 1A-1B.

Figure 2:
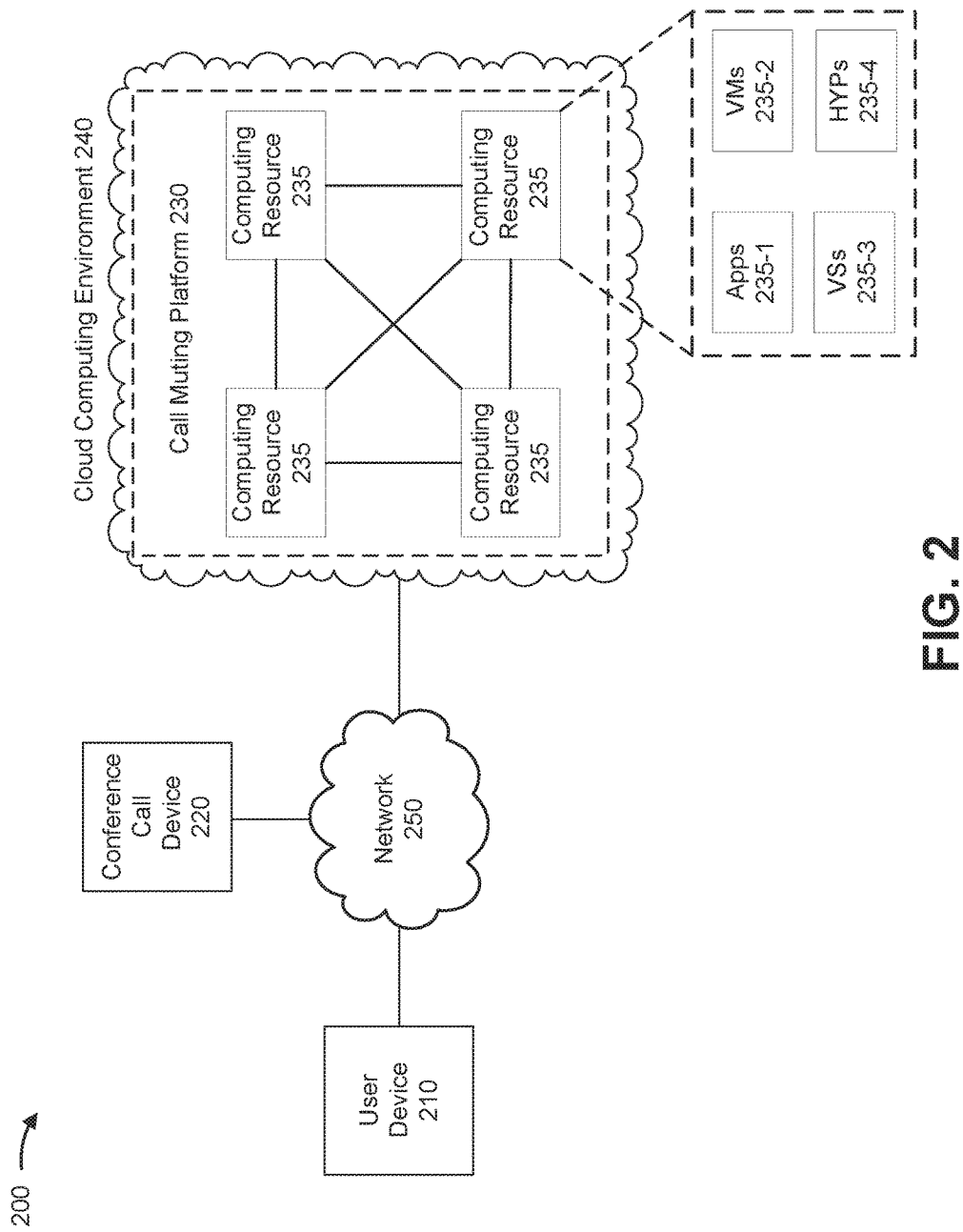
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a conference call device 220, a call muting platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with a conference call, such as call data, voice data, and/or mute data. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may include one or more applications designed to facilitate the performance of a conference call with other user devices 210, including providing call data and/or voice data to conference call device 220 and/or receiving mute data and/or voice data from conference call device 220.

Conference call device 220 includes one or more devices capable of receiving, generating, storing, processing, and/or providing information associated with a conference call, such as call data, voice data, and/or mute data. For example, conference call device 220 may include a server device (e.g., a host server, a web server, an application server, etc.), a data center device, or a similar device. Conference call device 220 may include one or more applications designed to facilitate the performance of a conference call among user devices 210, including managing the participation and interaction among user devices 210, receiving call data and/or voice data from user devices 210, providing voice data to user devices 210, and/or providing mute data to user devices 210, such as to mute and/or un-mute user devices 210 based on mute data received from call muting platform 230.

Call muting platform 230 includes one or more devices capable of receiving, generating, storing, processing, and/or providing information associated with a conference call, such as call data, voice data, and/or mute data. For example, call muting platform 230 may include a server device (e.g., a host server, a web server, an application server, etc.), a data center device, or a similar device. For example, call muting platform 230 may be capable of training a mute model based on call data and/or voice data received from user device 210 and/or conference call device 220, applying a trained mute model based on call data and/or voice data received from user device 210 and/or conference call device 220 to generate mute data associated with whether to mute or un-mute user devices 210, and/or providing mute data to user device 210 and/or conference call device 220 to be used to mute or un-mute user devices 210.

In some implementations, as shown, call muting platform 230 may be hosted in cloud computing environment 240. Notably, while implementations described herein describe call muting platform 230 as being hosted in cloud computing environment 240, in some implementations, call muting platform 230 might not be cloud-based (i.e., may be implemented outside of a cloud computing environment 240) or might be partially cloud-based.

Cloud computing environment 240 includes an environment that delivers computing as a service, whereby shared resources, services, etc. may be provided to call muting platform 230. Cloud computing environment 240 may provide computation, software, data access, storage, and/or other services that do not require end-user knowledge of a physical location and configuration of a system and/or a device that delivers the services. As shown, cloud computing environment 240 may include call muting platform 230 and computing resource 235.

Computing resource 235 includes one or more personal computers, workstation computers, server devices, or another type of computation and/or communication device. In some implementations, computing resource 235 may host call muting platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with call muting platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
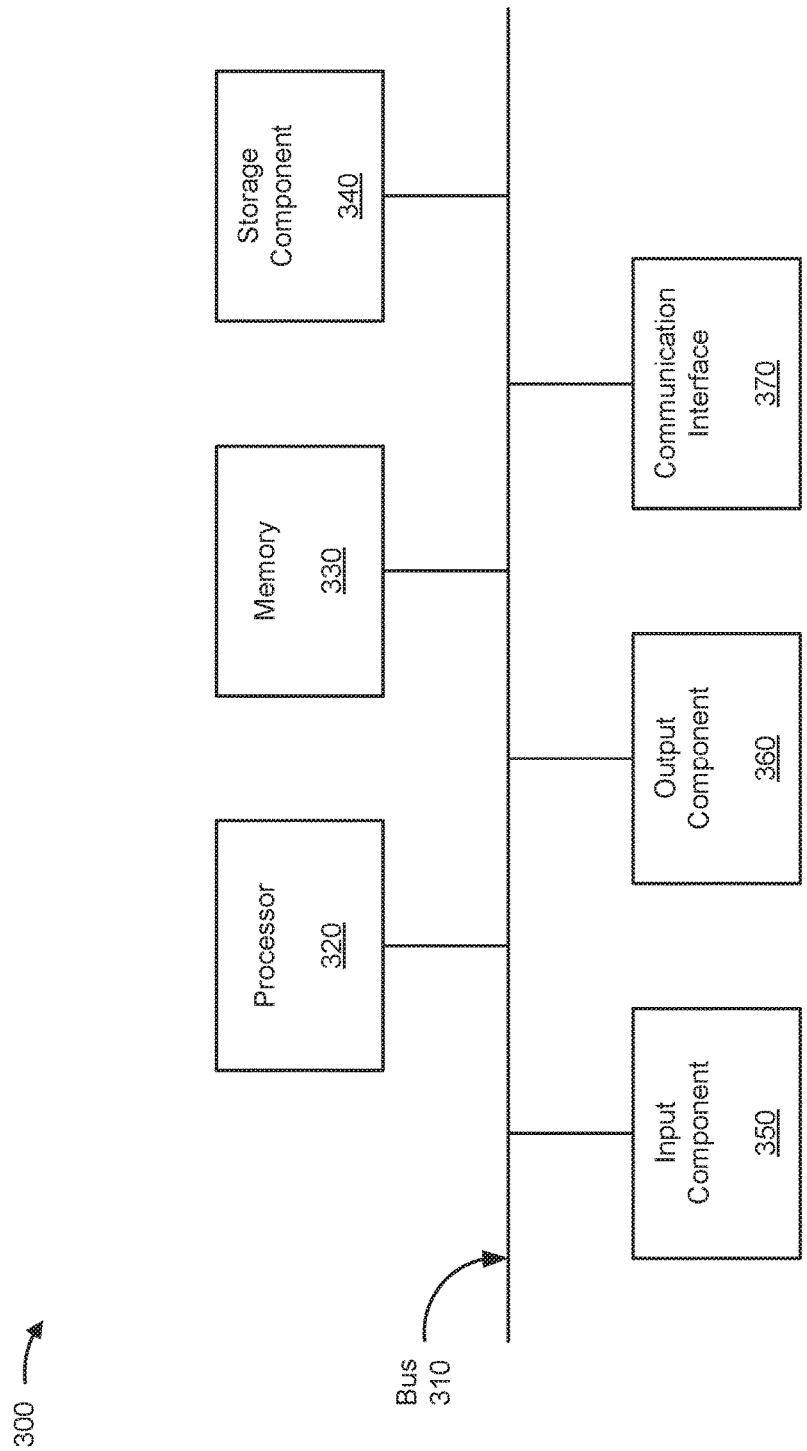
FIG. 3 is a diagram of example components of one or more devices of FIG. 2.

FIG. 3 is a diagram of example components of a device 300. Device 300 may correspond to user device 210, conference call device 220, call muting platform 230 and/or computing resource 235. In some implementations, user device 210, conference call device 220, call muting platform 230 and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
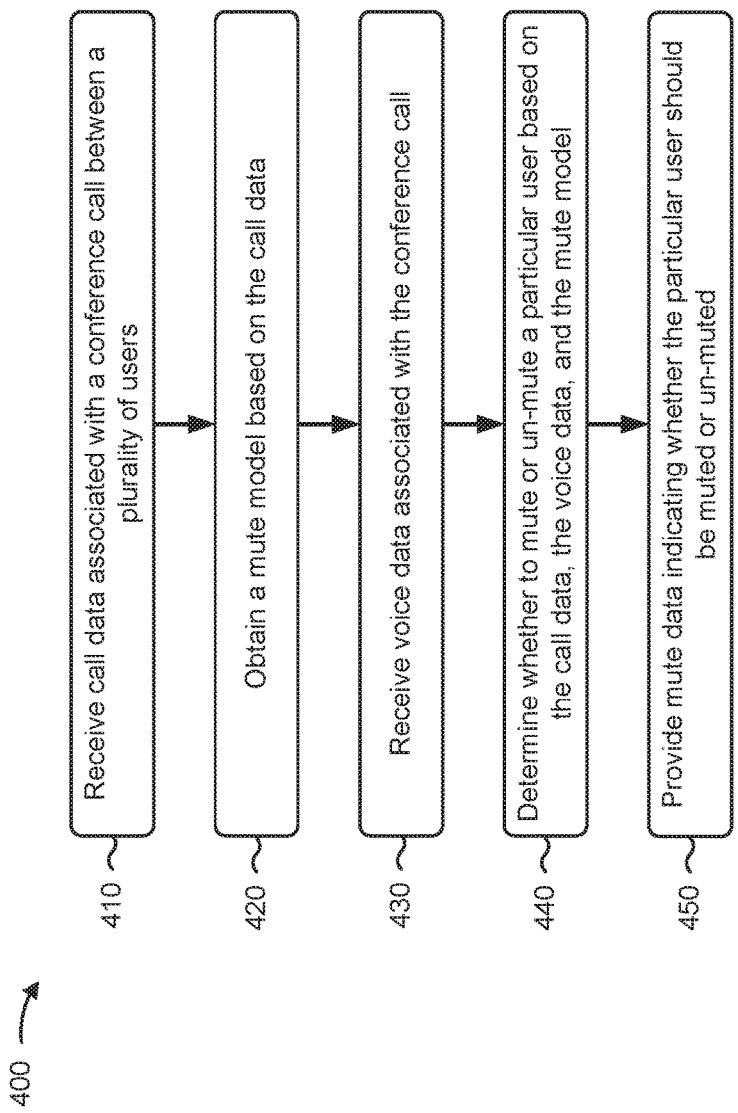
FIGS. 4-6 are flow charts of example processes for performing conference call mute management.

FIG. 4 is a flow chart of an example process 400 for performing conference call mute management. In some implementations, one or more process blocks of FIG. 4 may be performed by a call muting platform (e.g., call muting platform 230). In some implementations, one or more process blocks of FIG. 4 may be performed by another device or a group of devices separate from or including the call muting platform, such as a user device (e.g., user device 210), a conference call device (e.g., conference call device 220), and/or a computing resource (e.g., computing resource 235).

As shown in FIG. 4, process 400 may include receiving call data associated with a conference call between a plurality of users (block 410). For example, the call muting platform (e.g., using computing resource 235, processor 320, memory 330, storage component 340, input component 350, communications interface 370, and/or the like) may receive call data associated with a conference call between a plurality of users, as described above in connection with FIGS. 1A-1B. In some implementations, the call data may include data identifying the plurality of users, data identifying user activity associated with at least one user included in the plurality of users, and/or conference call metadata associated with the conference call.

As further shown in FIG. 4, process 400 may include obtaining a mute model based on the call data (block 420). For example, the call muting platform (e.g., using computing resource 235, processor 320, memory 330, storage component 340, input component 350, communications interface 370, and/or the like) may obtain a mute model based on the call data, as described above in connection with FIGS. 1A-1B. In some implementations, the mute model may be trained to receive voice data as input, and the mute model may be trained to produce mute data as output. In some implementations, the mute data may indicate whether a user should be muted or un-muted.

As further shown in FIG. 4, process 400 may include receiving voice data associated with the conference call (block 430). For example, the call muting platform (e.g., using computing resource 235, processor 320, memory 330, storage component 340, input component 350, communications interface 370, and/or the like) may receive voice data associated with the conference call, as described above in connection with FIGS. 1A-1B. In some implementations, the voice data may be associated with a vocal utterance associated with a particular user included in the plurality of users.

As further shown in FIG. 4, process 400 may include determining whether to mute or un-mute a user based on the call data, voice data, and the mute model (block 440). For example, the call muting platform (e.g., using computing resource 235, processor 320, memory 330, storage component 340, and/or the like) may determine, by the first device, whether to mute or un-mute the particular user based on the call data, the voice data, and the mute model, as described above in connection with FIGS. 1A-1B.

As further shown in FIG. 4, process 400 may include providing, to another device, mute data indicating whether the user should be muted or un-muted (block 450). For example, the call muting platform (e.g., using computing resource 235, processor 320, memory 330, storage component 340, output component 360, and/or the like) may provide, to a second device, mute data indicating whether the particular user should be muted or un-muted, as described above in connection with FIGS. 1A-1B.

Process 400 may include additional implementations, such as any single implementation or any combination of implementations described below and/or in connection with one or more other processes described elsewhere herein.

In some implementations, the data identifying the plurality of users may include user identifiers, user names, user electronic mail addresses, user mailing addresses, user phone numbers, user organizational roles, and/or user conference call roles. In some implementations, the data identifying user activity associated with the at least one user included in the plurality of users may include historical conference call data. In some implementations, the historical conference call data may indicate, for the at least one user, whether the user vocally contributed to a historical conference call.

In some implementations, the conference call metadata associated with the conference call may include a conference call title, a conference call subject, a conference call recurrence status, a conference call user list, and/or user conference call roles for the plurality of users. In some implementations, the vocal utterance may be identified as speech, and the mute data may indicate that the particular user should be un-muted. In some implementations, the vocal utterance may be identified as speech, and the mute data may indicate that the particular user should be muted. In some implementations, the mute data may be provided to a conference call device acting as a broker for the conference call.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
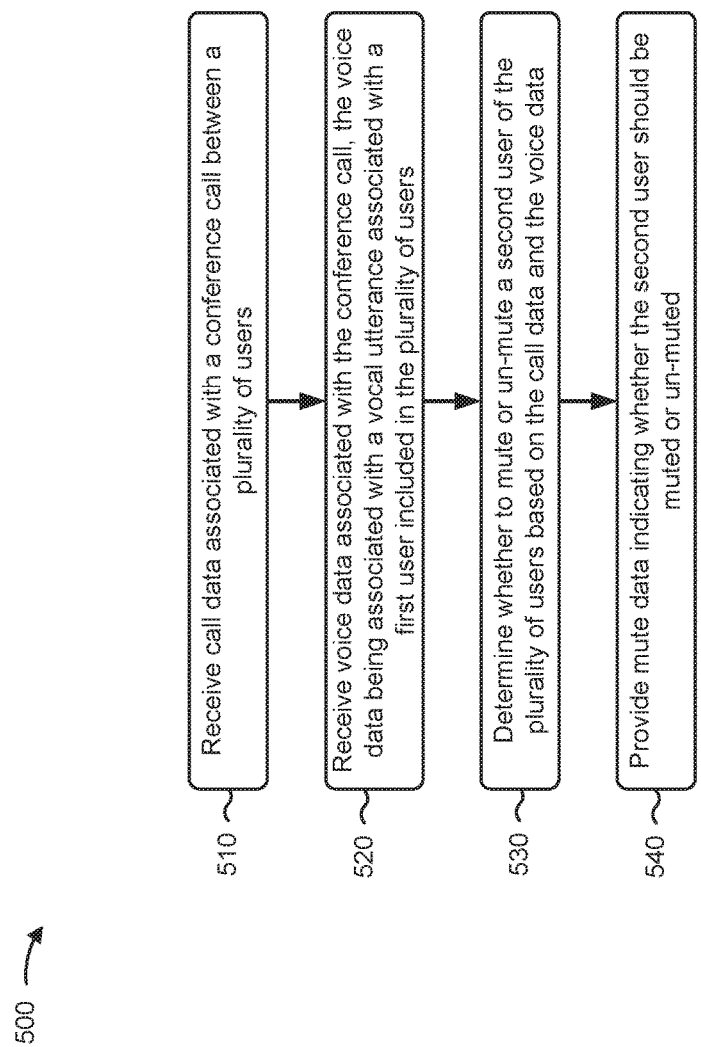

FIG. 5 is a flow chart of an example process 500 for performing conference call mute management. In some implementations, one or more process blocks of FIG. 5 may be performed by a call muting platform (e.g., call muting platform 230). In some implementations, one or more process blocks of FIG. 5 may be performed by another device or a group of devices separate from or including the call muting platform, such as a user device (e.g., user device 210), a conference call device (e.g., conference call device 220), and/or a computing resource (e.g., computing resource 235).

As shown in FIG. 5, process 500 may include receiving call data associated with a conference call between a plurality of users (block 510). For example, the call muting platform (e.g., using computing resource 235, processor 320, memory 330, storage component 340, input component 350, communications interface 370, and/or the like) may receive the call data associated with a conference call between a plurality of users, as described above in connection with FIGS. 1A-1B. In some implementations, the call data may include data identifying each of the plurality of users, data identifying user activity associated with at least one user in the plurality of users, and/or conference call metadata associated with the conference call.

As further shown in FIG. 5, process 500 may include receiving voice data associated with the conference call, the voice data being associated with a vocal utterance associated with a first user included in the plurality of users (block 520). For example, the call muting platform (e.g., using computing resource 235, processor 320, memory 330, storage component 340, input component 350, communications interface 370, and/or the like) may receive voice data associated with the conference call, the voice data associated with a vocal utterance associated with a first user included in the plurality of users, as described above in connection with FIGS. 1A-1B.

As further shown in FIG. 5, process 500 may include determining whether to mute or un-mute a second user of the plurality of users based on the call data and the voice data (block 530). For example, the call muting platform (e.g., using computing resource 235, processor 320, memory 330, storage component 340, and/or the like) may determine whether to mute or un-mute a second user of the plurality of users based on the call data and the voice data, as described above in connection with FIGS. 1A-1B.

As further shown in FIG. 5, process 500 may include providing mute data indicating whether the second user should be muted or un-muted (block 540). For example, the call muting platform (e.g., using computing resource 235, processor 320, memory 330, storage component 340, output component 360, communications interface 370, and/or the like) may provide, to a second device (e.g., user device 210 and/or conference call device 220), mute data indicating whether the second user should be muted or un-muted, as described above in connection with FIGS. 1A-1B.

Process 500 may include additional implementations, such as any single implementation or any combination of implementations described below and/or in connection with one or more other processes described elsewhere herein.

In some implementations, the vocal utterance may have been spoken by the first user and may identify the second user. In some implementations, the mute data may indicate that the second user should be un-muted. In some implementations, the mute data may indicate that the second user should be muted. In some implementations, the mute data may be based on the vocal utterance being associated with a global un-mute phrase and may indicate that each of the plurality of users should be un-muted.

In some implementations, the call muting platform, when determining whether to mute or un-mute the second user of the plurality of users based on the call data and the voice data, may identify a mute model based on the call data, provide the voice data as input to the mute model, and determine whether to mute or un-mute the second user based on output received from the mute model. In some implementations, the output received from the mute model may identify the second user. In some implementations, the output received from the mute model may include a measure of confidence, and the call muting platform, when determining whether to mute or un-mute the second user based on the output received from the mute model, may determine whether to mute or un-mute the second user based on the measure of confidence.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
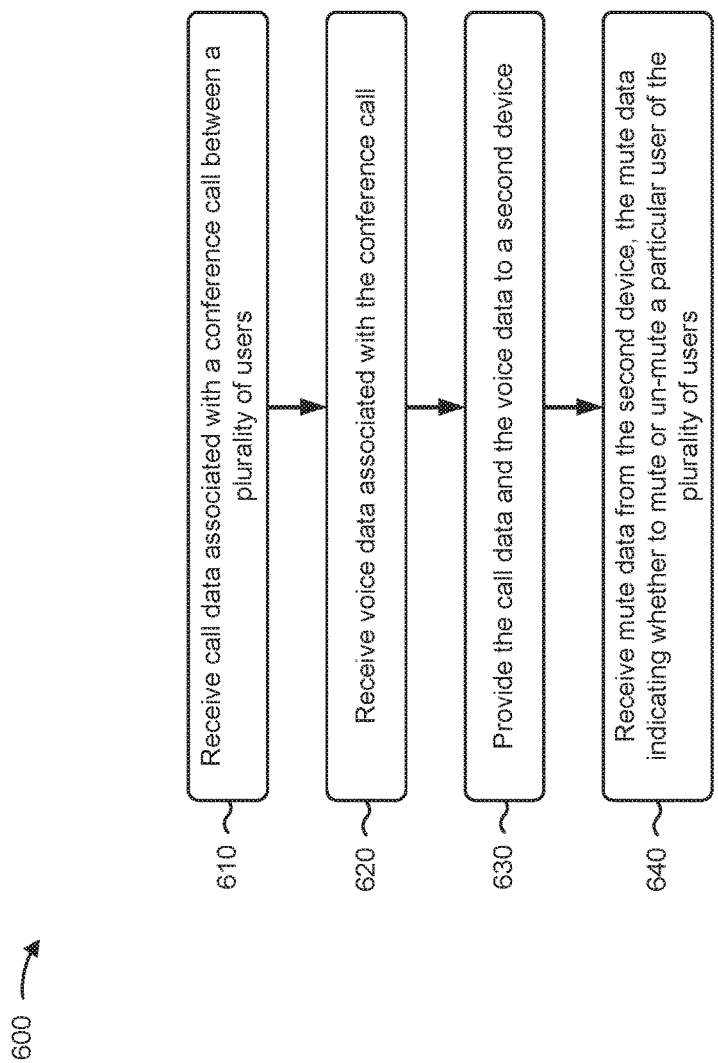

FIG. 6 is a flow chart of an example process 600 for performing conference call mute management. In some implementations, one or more process blocks of FIG. 6 may be performed by a user device (e.g., user device 210). In some implementations, one or more process blocks of FIG. 6 may be performed by another device or a group of devices separate from or including the call muting platform, such as a call muting platform (e.g., call muting platform 230), a conference call device (e.g., conference call device 220), and/or a computing resource (e.g., computing resource 235).

As shown in FIG. 6, process 600 may include receiving call data associated with a conference call between a plurality of users (block 610). For example, the user device (e.g., using processor 320, memory 330, storage component 340, input component 350, communications interface 370, and/or the like) may receive call data associated with a conference call between a plurality of users, as described above in connection with FIGS. 1A-1B. In some implementations, the call data may include at least two of: data identifying each of the plurality of users, data identifying user activity associated with at least one user in the plurality of users, and conference call metadata associated with the conference call.

As further shown in FIG. 6, process 600 may include receiving voice data associated with the conference call (block 620). For example, the user device (e.g., using processor 320, memory 330, storage component 340, input component 350, communications interface 370, and/or the like) may receive voice data associated with the conference call, as described above in connection with FIGS. 1A-1B. In some implementations, the voice data may be associated with at least one vocal utterance associated with the plurality of users.

As further shown in FIG. 6, process 600 may include providing the call data and the voice data to a second device (block 630). For example, the user device (e.g., using processor 320, memory 330, storage component 340, output component 360, communications interface 370, and/or the like) may provide the call data and the voice data to a second device (e.g., conference call device 220 and/or call muting platform 230), as described above in connection with FIGS. 1A-1B.

As further shown in FIG. 6, process 600 may include receiving mute data from the second device (block 640). For example, the user device (e.g., using processor 320, memory 330, storage component 340, input component 350, communications interface 370, and/or the like) may receive mute data from the second device, as described above in connection with FIGS. 1A-1B. In some implementations, the mute data may indicate whether to mute or un-mute a particular user of the plurality of users.

Process 600 may include additional implementations, such as any single implementation or any combination of implementations described below and/or in connection with one or more other processes described elsewhere herein.

In some implementations, the call muting platform receiving the mute data may cause the device to mute a microphone associated with the device. In some implementations, the call muting platform receiving the mute data may cause the device to un-mute a microphone associated with the device. In some implementations, the call muting platform receiving the mute data may cause the device to cause display of a mute indicator. For example, the mute indicator may provide a recommendation to mute or un-mute a microphone associated with the device. As another example, the mute indicator may provide a recommendation to mute or un-mute the particular user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, a call muting platform 230 may facilitate mute and un-mute operations automatically for a conference call, in a manner designed to ensure that users participating in the conference call are muted and/or un-muted as appropriate. Automatically managing the mute and/or un-mute operations may improve user experience for participants in a conference call. Automating one or more stages of the process for conference call mute management may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for conference call mute management conserves computing resources (e.g., processor resources, memory resources, and/or the like) and time that would otherwise be wasted by using manual investigative processes for attempting to determine when a conference call line should be muted or un-muted.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, historical conference call data associated with a plurality of conference calls,
        the historical conference call data including, for each conference call included in the plurality of conference calls, at least one of:
            data identifying a plurality of users associated with the conference call,
            data identifying user activity associated with at least one user included in the plurality of users, or
            conference call metadata associated with the conference call;
    training, by the device, a mute model based on the historical conference call data,
        the mute model being trained to receive voice data as input, and
        the mute model being trained to produce mute data as output,
            the mute data indicating whether a user should be muted or un-muted; and
    providing, by the device, the mute model for use in determining, during a particular conference call, whether to mute or un-mute a conference call participant associated with the particular conference call.

2. The method of claim 1, wherein the mute data is associated with instructions that cause a second device to:
    mute the conference call participant, or
    un-mute the conference call participant.

3. The method of claim 1, wherein providing the mute model comprises:
    providing the mute model to a user device associated with the conference call participant associated with the particular conference call.

4. The method of claim 1, wherein providing the mute model comprises:
    providing the mute model to a conference call broker device associated with the particular conference call.

5. The method of claim 1, wherein the data identifying user activity associated with the at least one user included in the plurality of users includes:
    data indicating, for the at least one user, whether the at least one user vocally contributed to a historical conference call.

6. The method of claim 1, wherein the data identifying the plurality of users includes at least one of:
    user identifiers,
    user names,
    user electronic mail addresses,
    user mailing addresses,
    user phone numbers,
    user organizational roles, or
    user conference call roles.

7. The method of claim 1, wherein the conference call metadata associated with the conference call includes at least one of:
    a conference call title,
    a conference call subject,
    a conference call recurrence status,
    a conference call user list, or
    user conference call roles for the plurality of users.

8. A device comprising:
    one or more memories; and
    one or more processors, communicatively coupled to the one or more memories, configured to:
        receive historical conference call data associated with a plurality of conference calls,
            the historical conference call data including, for each conference call included in the plurality of conference calls, at least one of:
                data identifying a plurality of users associated with the conference call,
                data identifying user activity associated with at least one user included in the plurality of users, or
                conference call metadata associated with the conference call;
        train a mute model based on the historical conference call data,
            the mute model being trained to receive voice data as input, and
            the mute model being trained to produce mute data as output,
                the mute data indicating whether a user should be muted or un-muted;
        receive call data associated with a particular conference call;
        determine, based on the mute model, particular mute data indicating that a particular user associated with the particular conference call should be muted or un-muted; and
        provide, based on the particular mute data, mute instructions that cause a user device associated with the particular user to be muted or un-muted.

9. The device of claim 8, wherein the mute instructions further cause the user device to display a visual indicator.

10. The device of claim 9, wherein the visual indicator includes data indicating whether the particular user should be muted or un-muted.

11. The device of claim 8, wherein the mute data is associated with instructions that cause a second device to:
    mute the user, or
    un-mute the user.

12. The device of claim 8, wherein the one or more processors, when providing the mute instructions, are further configured to:
provide the mute instructions to the user device associated with the particular user.

13. The device of claim 8, wherein the one or more processors, when providing the mute instructions, are further configured to:
provide the mute instructions to a second user device associated with the particular conference call, the second user device being associated with a second user that is different from the particular user.

14. The device of claim 8, wherein the one or more processors, when providing the mute instructions, are further configured to:
provide the mute instructions to a conference call broker device associated with the particular conference call.

15. A non-transitory computer-readable medium storing instructions, the instructions comprising:
one or more instructions that, when executed by one or more processors, cause the one or more processors to:
receive historical conference call data associated with a plurality of conference calls,
the historical conference call data including, for each conference call included in the plurality of conference calls, at least one of:
data identifying a plurality of users associated with the conference call,
data identifying user activity associated with at least one user included in the plurality of users, or
conference call metadata associated with the conference call;
train a mute model based on the historical conference call data,
the mute model being trained to receive voice data as input, and
the mute model being trained to produce mute data as output,
the mute data indicating whether a user should be muted or un-muted;
receive a request for a particular mute model associated with a particular conference call;
identify, based on particular conference call metadata associated with the request, the mute model; and
provide, based on the request for the mute model, the mute model.

16. The non-transitory computer-readable medium of claim 15, wherein:
the historical conference call data includes voice data,
the voice data being associated with vocal utterances associated with plurality of conference calls; and
the one or more instructions, that cause the one or more processors to train the mute model, further cause the one or more processors to:
train the mute model based on the voice data.

17. The non-transitory computer-readable medium of claim 15, wherein the one or more instructions, when executed by the one or more processors, further cause the one or more processors to:
train a user recognition model based on the historical conference call data,
the user recognition model being trained to receive the voice data as input, and
the user recognition model being trained to produce data identifying a particular user.

18. The non-transitory computer-readable medium of claim 17, wherein the data identifying the particular user includes at least one of:
a user identifier,
a user name,
a user electronic mail address,
a user mailing address,
a user phone number,
a user organizational role, or
a user conference call role.

19. The non-transitory computer-readable medium of claim 15, wherein the one or more instructions, that cause the one or more processors to identify the mute model, further cause the one or more processors to:
identify the mute model based on identifying, using the particular conference call metadata, a particular user as a participant of the particular conference call.

20. The non-transitory computer-readable medium of claim 19, wherein the particular user vocally contributed to at least one historical conference call used to train the mute model.

* * * * *